United States Patent

[11] 3,526,244

| [72] | Inventor | Raymond D. Joy |
| | | Clarksville, Virginia |
| [21] | Appl. No. | 722,417 |
| [22] | Filed | April 18, 1968 |
| [45] | Patented | Sept. 1, 1970 |
| [73] | Assignee | Burlington Industries Inc. |
| | | Greensboro, North Carolina |
| | | a corporation of Delaware |

[54] CARD PROGRAMMING AND CONTROL SYSTEM
7 Claims, 5 Drawing Figs.

[52] U.S. Cl. .................................................. 137/86,
137/624.11, 57/93
[51] Int. Cl. ....................................................... D01h 13/00,
G05d 16/16, F15b 5/00
[50] Field of Search .......................................... 137/82, 85,
86, 624.13, 624.16, 624.17, 624.11; 91/37, 385;
57/93, 95; 242/26.1

[56] References Cited
UNITED STATES PATENTS

| 779,803 | 1/1905 | Rocco | 137/624.13 |
| 1,937,666 | 12/1933 | Olson et al. | 137/624.13X |
| 2,166,705 | 7/1939 | Hochschulz | 137/85UX |
| 2,285,540 | 6/1942 | Stein et al. | 137/86UX |
| 2,989,950 | 6/1961 | Lockman | 137/85X |
| 3,052,254 | 9/1962 | Parks | 137/85 |
| 3,158,320 | 11/1964 | Duncan | 137/86X |
| 3,315,250 | 4/1967 | Higgins, Jr. | 137/85X |
| 3,326,228 | 6/1967 | Phillips | 137/86 |

Primary Examiner—Robert G. Nilson
Attorney—Cushman, Darby and Cushman

ABSTRACT: A system for programming a parameter of desired functions into an operation to effect the condition of the operation in accordance with the parameter programmed, the system including utilizing a transducer to sense the state of the operation at a particular time and to translate the sensed state into rotary motion, a program card rotatable by the rotary motion of the transducer, the program card having its peripheral profile so shaped as to provide a parameter of functions for an operation at a particular state of the operation, the profile of the card determining magnitude of the condition at a particular state and rate of change of magnitude between different states of the operation. Further, the system includes a programming and controlling means responsive to the changes in profile of the program card for emitting a pressure control signal directly proportional in magnitude to the signals provided by the profile of the program card. Such a system enables programming a complete operation to provide, in any combination, the functions of the parameter such as starting magnitude, magnitude of rate increase to reach a particular increased magnitude, magnitude of rate decrease to reach any particular decrease magnitude, maximum magnitude, minimum magnitude, and any intermediate magnitude.

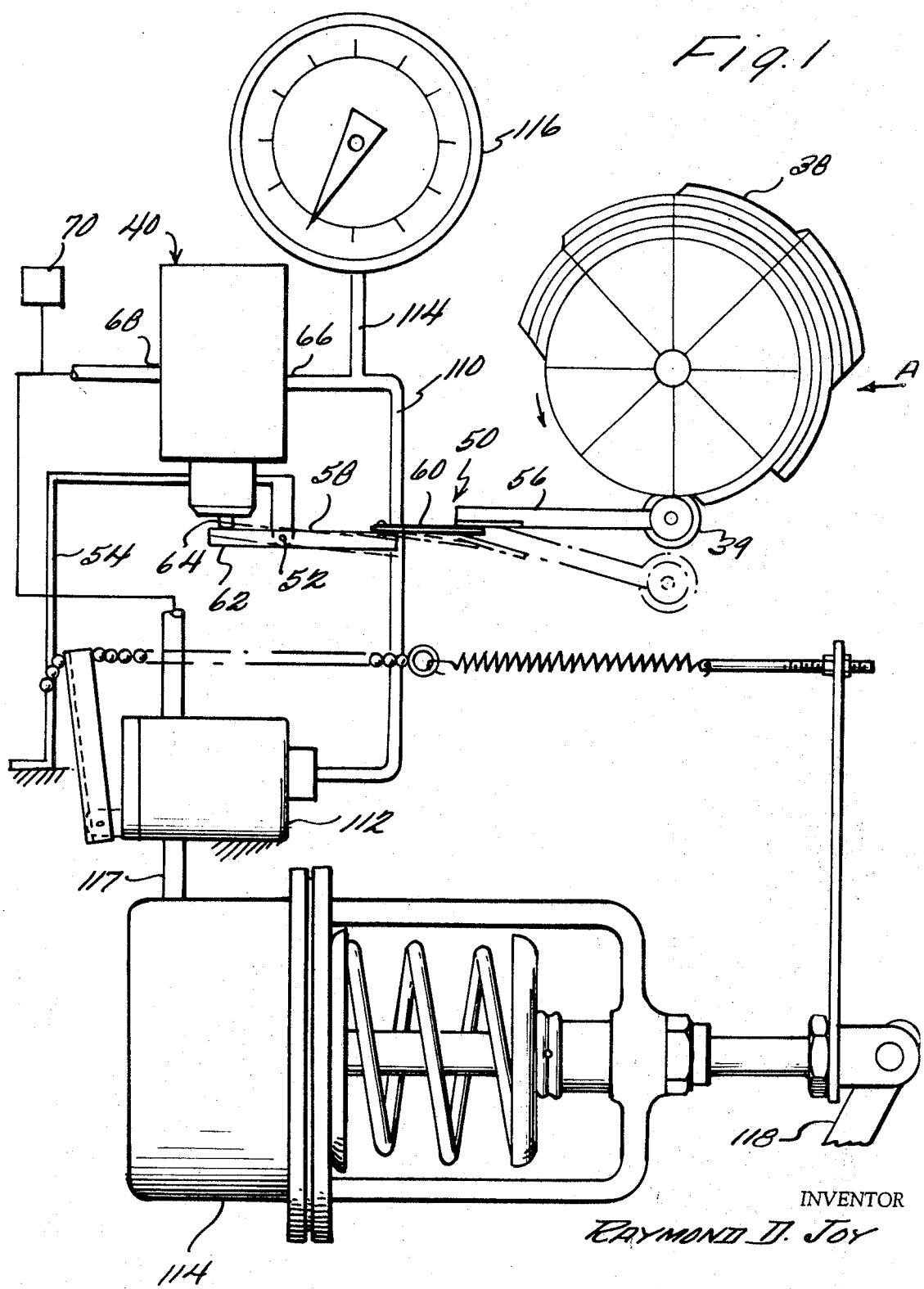

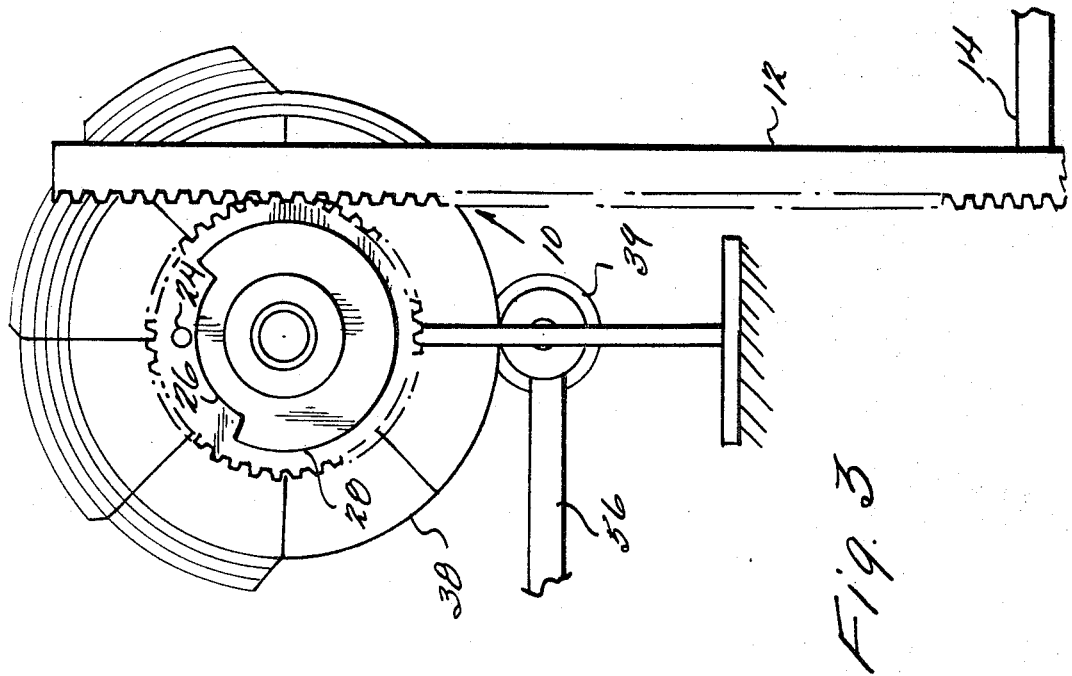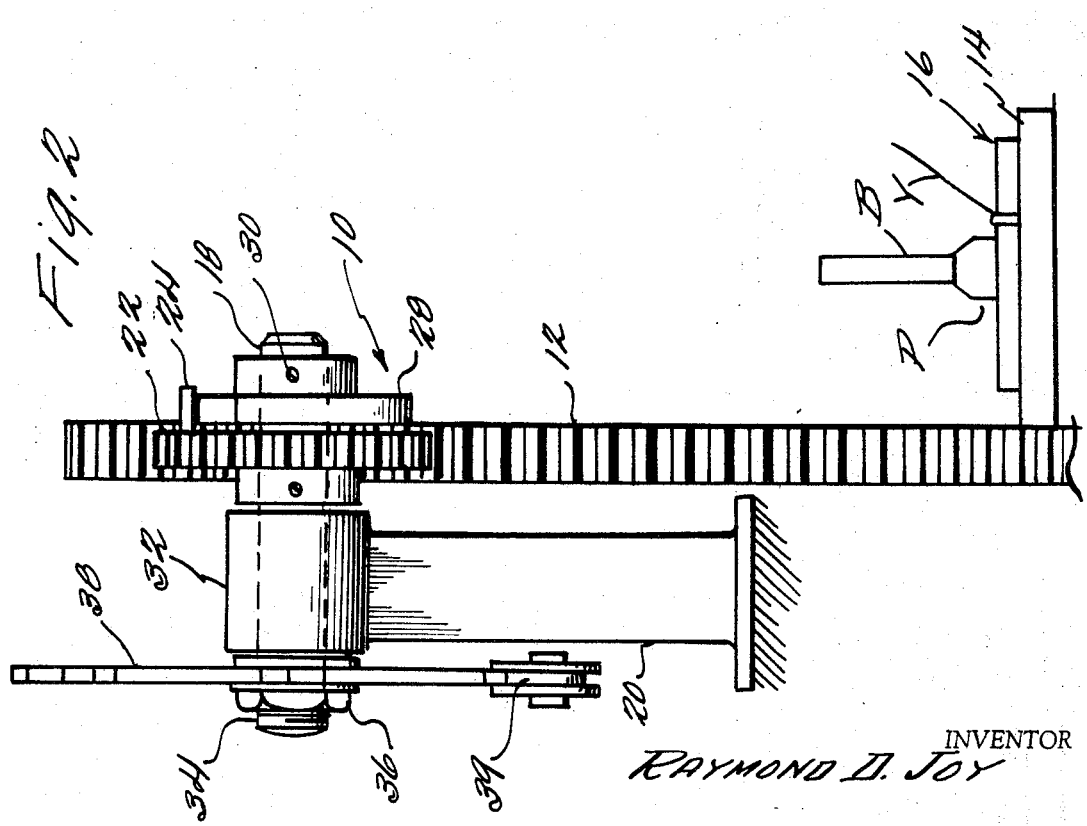

Patented Sept. 1, 1970
3,526,244
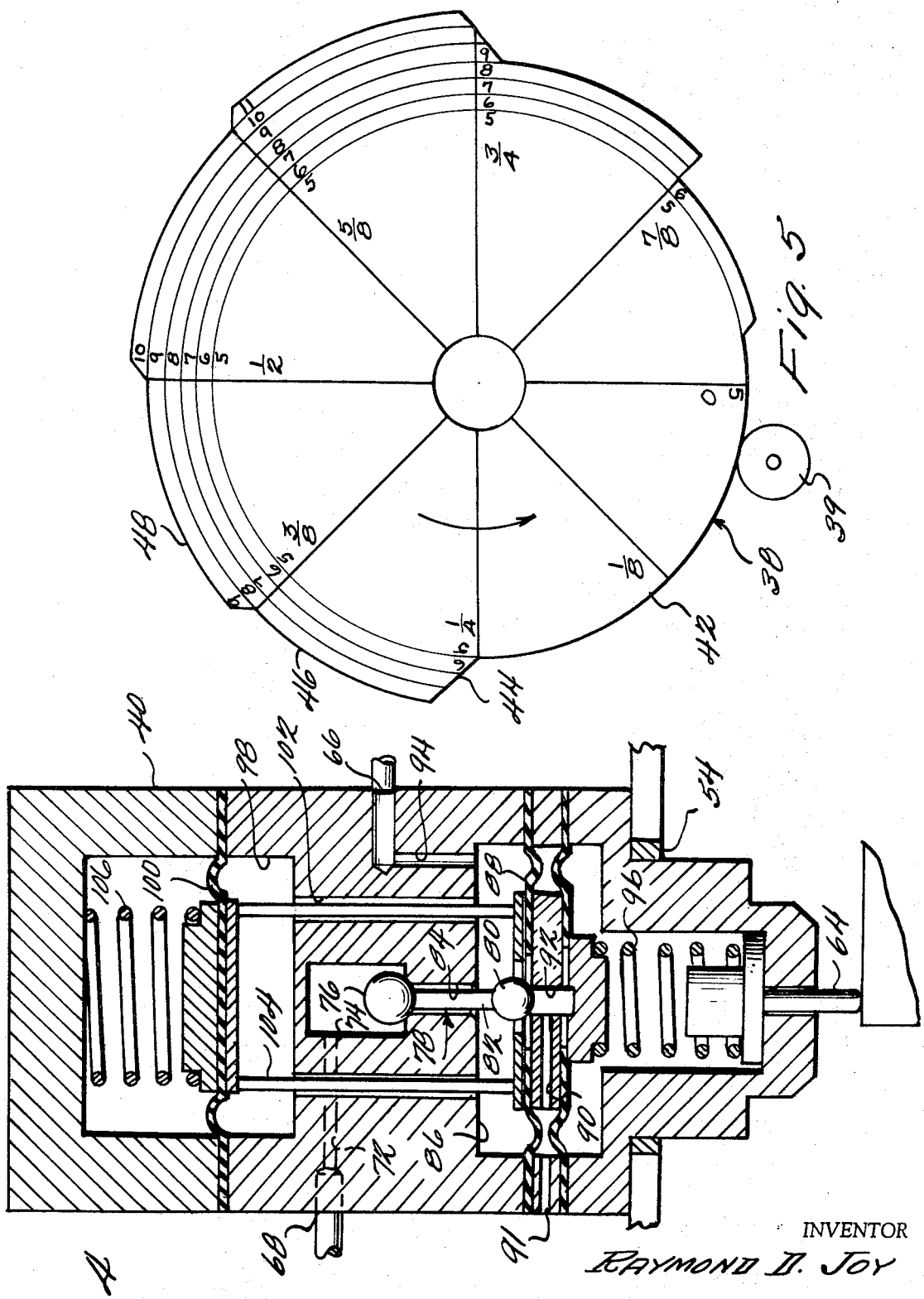
INVENTOR
RAYMOND H. JOY
BY Cushman, Darby & Cushman
ATTORNEYS

CARD PROGRAMMING AND CONTROL SYSTEM

The present invention relates to system for programming and controlling the parameter of an operation as the operation progresses, the program providing for predetermined results in the operation. More specifically, the system of the present invention is capable of programming and controlling speeds of various types of drives, differentials of temperature for various temperature controlled systems, differentials in pressure for various pressure systems, differentials in volume by control of valve settings, and many other applications where a desired present condition is required at a particular time during a particular operation.

The present invention is an improvement over the system disclosed in my U.S. Pat. No. 3,332,224 issued July 25, 1967, as well as in my copending U.S. application Ser. No. 697,533 filed January 12, 1968.

While the present system may be utilized to set up a parameter for controlling temperature, volume, pressure, liquid level, or the like, for the purpose of the description in the specification, the invention will be described in connection with programming and controlling speed, for example, in the operation of a winding machine such as a spinning frame. In this respect, when yarn is wound on a bobbin, the speed of the bobbin must be varied within the build of the bobbin to provide optimum conditions for winding. The conditions vary for different yarns and different types of winding machines, depending upon the various factors unique to the equipment and material involved. Consequently, the system must be capable of setting up a program to provide for optimum conditions of operation dependent upon the factors involved, and such a system should be capable of obtaining repeatability of the program for separate operations.

Heretofore, various systems have been used for programming an operation. Such systems have utilized a transducer for sensing the state of a condition and translating this into a pressure signal which is in turn fed into a receiver-controller instrument, which interprets the signal and modifies the same in accordance with numerous signal and modifies the same in accordance with numerous pressure modules and then transmits a pressure control signal for changing the condition of the operation. While such prior systems have been somewhat successful, they did have certain disadvantages in that they were costly to install, required too many pressure operated units for the various functions programmed which could get out of adjustment, and required constant maintenance.

Briefly, the system of the present invention for programming desired functions into a parameter effecting an operation being conducted includes a transducer means for sensing the state of the operation at a particular time and translating this state into a mechanical movement such as rotary motion. A card having its periphery provided with a selected profile so shaped as to define a predetermined program is rotated by the transducer means for each change in the state of the operation, the card in turn providing a mechanical signal to a pressure relay, the mechanical signal functioning to modify the output pressure control signal from the pressure relay to thereby modify or change the condition of the operation at the particular state of operation being performed. The program for the operation may be easily changed by merely changing the program card in the system to another card having another selected profile program thereon.

An object of the present invention is to provide an improved system for setting up a parameter having different functions and controlling an operation at a particular time in accordance with the program set up, the system utilizing a minimum number of units and yet capable of wide variation in programs.

Another object of the present invention is to provide a system for programming and controlling an operation by a combination of mechanical and pressure signals, the system having reliability enabling repeating of an operation with uniform accuracy.

Still another object of the present invention is to provide an improved system for programming and controlling an operation to effect a condition at a particular state of the operation, the system being such that the magnitude of the parameter of the operation may be widely varied to produce a number of desired limits.

The aforementioned objects and advantages of the present invention as well as other objects and advantages will appear more fully in the following specification, claims and drawings in which:

FIG. 1 is a diagrammatic view of the programming system of the present invention as applied, for example, to a winding machine or the like, the view omitting the transducer unit for the purpose of clarity;

FIG. 2 is an enlarged fragmentary view of the transducer unit and program card taken generally in the direction of the arrow A in FIG. 1;

FIG. 3 is a side elevational view of the transducer unit and the program card looking from the right toward the left of FIG. 2, parts being omitted for the purpose of clarity;

FIG. 4 is an enlarged sectional view through the pressure relay of the system of FIG. 1; and FIG. 5 is a side elevational view of a program card having its peripheral profile shaped to provide a predetermined program.

Referring now to the drawings wherein like character or reference numerals represent like or similar parts and in particular to FIG. 1, the present invention is disclosed in association with a spinning frame generally of the type as shown in the aforementioned U.S. Pat. No. 3,332,224. The spinning frame may be of the usual type having head frame members with longitudinally extending frame members therebetween, a plurality of bobbin-receiving spindles and a vertically reciprocating and traversing ring rail. As is customary of spinning frames of this type, the ring rail, at a particular position of traverse, reciprocates in short strokes as yarn is being wound onto the rotating bobbins, the ring rail, after a predetermined amount of yarn is built on the bobbin, being moved upwardly to a new position of traverse. The progressive periodic or step-by-step upwardly progressing movement of the ring rail and reciprocation of the same in short strokes in each position of traverse builds the package on the bobbin and when the package is complete, the ring rail is moved downwardly to an empty bobbin position so that the full bobbin can be doffed from its spindle and replaced by an empty bobbin.

As disclosed in the aforementioned U.S. Pat. No. 3,332,224, the position of traverse of the ring rail, the amount of build on the bobbin, the type of yarn being wound, are some of the factors which determine the optimum speed of rotation of the bobbin at a particular position of traverse during the cycle of the filling operation so that the yarn is wound at a proper tension. The speed of rotation of the bobbin is varied by varying the speed of the main drive shaft through a variable speed drive, the present invention being utilized to program and control operation of the variable speed drive.

Throughout the specification and the claims, the term "state" is used in defining broadly a position of traverse of the ring rail at a particular moment. For that matter, the word "state" is intended to cover a point or position, or a condition at a particular increment in the overall cycle of operation. When the state of an operation is sensed, the system of the present invention interprets this and furnishes a proper pressure signal to cause the condition at the state to be changed in accordance with a predetermined condition, in this instance, a predetermined speed or rate of change of speed.

The present invention utilizes a transducer unit generally indicated at 10 (FIGS. 2 and 3) for sensing the state of the operation being performed. Transducer unit 10 includes a gear rack 12 mounted directly on the end of a reciprocating ring rail 14 of a winding machine (not shown), the position of the rack changing with each traverse of the ring rail. Ring rail 14 includes the usual ring and traveler units generally designated at 16 through which the bobbins B extend. The yarn Y passes through the traveler units 16 and is wound onto the bobbin B as a package P. Transducer unit 10 further includes an output shaft 18 mounted in a bearing 32 of a bracket 20 carried on the fixed frame structure of the winding machine. The output shaft 18 translates into rotary motion the linear motion of the rack 12 and, thus, the rotary motion is a mechanical signal directly proportional to the state of the operation. In more detail, a pinion 22 is rotatably mounted on the output shaft 18, the pinion meshing with the teeth of the gear rack 12. Pinion 22 has extending from its face in an axial direction a pin 24 which rides in an arcuate cutout portion 26 of a drive wheel 28 fixedly mounted to the output shaft 18 by a set screw 30. The ends of the arcuate cutout portion 26 provide stops which, when engaged by the pin 24, cause the drive wheel 28 to be rotated so as to rotate the output shaft 18. In other words, by providing such an arrangement, the ring rail 14 may reciprocate at a point of traverse and, consequently, the gear rack 12 may reciprocate without causing the shaft 18 to rotate back and forth at that particular point of traverse. Of course, when the ring rail 14 moves to a new point of traverse, the pin 24 will engage a particular end of the arcuate cutout portion 26 of the drive wheel 28 and will rotate the drive wheel 28 together with the output shaft 18 a predetermined amount.

The output shaft 18 extends through and out of the bearing 32 of bracket 20, the portion of the output shaft extending out of the bearing being threaded at its outer end as indicated at 34 for receiving a nut 36 which retains a program card 38 against a washer 37 and on the output shaft for rotation by the output shaft. Program card 38, which may be made from any suitable stiff sheet material such as plastics, cardboard, metals, or the like, is formed from a circular disc by cutting a profile in the periphery theoreof to define a particular program. In this respect, the program cards 38 may be provided with indicia defining a predetermined number of scribed spokes or radii lines. The scribed spokes or radii lines, as shown in FIG. 5, represent various states or points of the complete operation, the complete operation being represented by the entire 360° of the card. For example, and assuming the system is used with a winding machine, the numbers zero, one-eighth, one-fourth, three-eights, one-half, five-eights, three-fourths and seven-eighths on the profile card 38 of FIG. 5 represent the percent of the full cycle of the operation of building the package P on the bobbin B. Additionally, the profile card is provided with a plurality of scribed circles, each identified by numbers representing revolutions per minute of the bobbin B. The program card 38 of FIG. 5 has been cut about its periphery to define a profile for a complete program for the winding of the yarn package P onto the bobbin B. As will be explained in more detail later in the specification, a follower 39 riding on the periphery of the program card will follow the contour of the profile and cause a pressure relay 40 to vary its output control pressure signal that in turn controls the variable speed drive for changing the speed of the bobbin B.

The particular program shown in FIG. 5 by way of example indicates that at the lowermost portion of the ring rail 14 when yarn is first being wound onto the bobbin, the bobbin will be rotated at 5,000 r.p.m. As the ring rail 14 travels upwardly through its various positions of traverse to one-eighth of a full cycle, the speed of the bobbin will remain at 5,000 r.p.m. as the arcuate extent 42 is cut on the circumference of the scribed circle for 5,000 r.p.m. When the ring rail 14 reaches one-fourth of its complete movement, the follower 39 will then engage a portion 44 of the periphery of the profile card which extends at an angle to a tangent through the circumferential extent 42 or through the next adjacent arcuate circumferential extent 46. The angle of the portion 44 determines the rate of change of speed of the bobbin B as the speed changes from 5,000 r.p.m. up to 8,000 r.p.m. At three-eighths of the complete cycle the speed again changes to 9,000 when the follower engages the circumferential arcuate extent 48. This procedure follows around the periphery of the card as the follower's position is changed, it being appreciated that the speed may be decreased if so desired such as shown when three-fourths of the complete cycle of operation has been reached. At three-fourths of the complete cycle the speed drops from 11,000 r.p.m. down to 8,000 r.p.m. and will remain at 8,000 r.p.m. until seven-eighths of the cycle has been completed. By changing the slopes of the angled portions between adjacent circumferential extents, the rate of increase or the rate of decrease may be varied. In fact, if the angled portion between two circumferential arcuate extents lies on a radius of the profile card, there will be a sudden drop in speed such as shown at seven-eighths of the complete cycle where the speed drops abruptly from 8,000 to 6,000 r.p.m. It will be appreciated that the program card can be provided with any particular contour for its peripheral profile whereby the program can have magnitude of operation which is constant between predetermined states of the operation or progressively increasing or decreasing, or a combination thereof.

Referring now back to FIG. 1, it will be noted that the follower wheel 39 is rotatably supported on one end of a lever member generally designated at 50, the lever member being pivotally mounted, as indicated at 52, on a bracket 54 supported from fixed structure of the frame of the winding machine. Lever member 50 includes a first arm 56 connected to a second arm 58 by means of a leaf spring 60 which provides resiliency therebetween. The end 62 of the lever member 50, which is opposite to the end on which the follower wheel 39 is mounted, is adapted to bear against a plunger 64 extending from the interior of the pressure relay 40. The movement of the plunger 64 by the lever member 50 as controlled by the profile of the program card 38 causes the pressure relay 40 to vary its output control signal from its output port 66 thus causing an ultimate change in the magnitude of the condition of the operation at a particular state.

In more detail, the pressure relay 40 is fixedly supported by the bracket 54 and is provided with an inlet port 68 which receives fluid under a constant pressure, for example, 20 pounds per square inch from a source of supply pressure 70. Inlet port 68 communicates by a passage 72 with a chamber 74. The chamber 74 is provided with a ball valve element 76 of a valve member 78, the valve member having a second ball valve element 80 connected to the ball valve element 76 by a pin 82 extending through a passage 84. The passage 84 communicates with the chamber 74 and with a second chamber 86, the second chamber being provided with a pressure responsive and spring biased diaphragm 88 therein. The diaphragm 88 is provided with an exhaust passage 90 therethrough which communicates with atmosphere at port 91 and with a well 92 open to the chamber 86 but capable of being closed from the chamber 86 by means of the ball valve element 80. The outlet port 66 communicates with chamber 86 by means of a passage 94. A spring 96 interposed between the diaphragm 88 and the plunger 64 normally urges the diaphragm upwardly against the pressure of fluid in the chamber 86 and toward the ball valve element 80.

A third chamber 98 is provided in the pressure relay 40, the chamber 98 also having a diaphragm 100 therein. Chamber 98 communicates with chamber 86 by means of passages 102, the passages 102 also providing means for receiving rods 104 which connect diaphragms 88 and 100 to each other. The upper diaphragm 100 is spring urged by a spring 106 downwardly, as viewed in FIG. 4, in a direction opposing the spring 96 which urges the lower diaphragm 88 upwardly.

The operation of the pressure relay 40 will now be briefly described. When the follower 39 is moved downwardly by the profile card 38 to indicate that an increase in speed is necessary, the end 62 of the lever member 60 moves upwardly causing the plunger 64 to move upwardly. The plunger 64, which has its end within the pressure relay 40 bearing against the spring 96 and, thus, compresses the spring 96 against the lower diaphragm 88 causing the lower diaphragm to move upwardly thereby closing the exhaust port 91 by seating the valve element 80 on the valve seat surrounding the well 92. Movement of the diaphragm 88 together with the ball valve element 80 upwardly causes the upper ball valve element 76 to unseat and open the passage 84 between chambers 74 and 86. This movement of diaphragm 88 also causes the balance spring 106 to compress through the corresponding movement of the upper diaphragm 100 by the rods 104. Pressure flows through the inlet port 68 into the chamber 74 past the open ball valve element 76 into the chamber 86 and out through the passage 94 to define a predetermined output pressure control signal.

As pressure builds up in the chamber 86, it will overcome the force of the spring 96 causing it to compress downwardly against the set position of the plunger 64 thus resulting in the valve element 76 closing off the chamber 74 from the chamber 86. When this action occurs, both ball valve elements 76 and 80 are seated and this establishes a balanced position between the upper and lower diaphragm assemblies 100 and 88 and the output control signal will be constant to maintain a constant magnitude at a particular stage for the operation. The above-described operation will occur each time the follower 39 is caused to move by a circumferential arcuate extent having a greater radii than the previous extent.

When the follower 39 follows a portion on the periphery of the profile card which indicates that a decrease in speed is necessary, the reverse of the above operation occurs causing the diaphragm assemblies 88 and 100 to move downwardly with the lower ball valve element 80 becoming unseated so that pressure can be bled to atmosphere through the exhaust port 91 from the chamber 86 and, consequently, reducing the pressure of the output control signal from the outlet port 66.

As shown in FIG. 1, the output pressure control signal is fed through a conduit 110 to a pneumatic relay 112. The conduit 110 is provided with a branch conduit 114 which is connected to a pressure gauge instrument 116. The pressure gauge instrument 116 is calibrated on its face to read r.p.m.'s for a particular output pressure control signal and, consequently, the operator may have visual knowledge of the actual speed at which the winding machine is operating at any given instance.

The pneumatic relay 112 is supplied with fluid under a constant pressure, for example, 20 pounds per square inch from the source of pressure 70. A pressure signal dependent upon the output pressure signal from the pressure relay 40 is supplied from the pneumatic relay 112 to an air motor 114 by the conduit 117. The air motor 114 in turn is connected to an arm 118 for varying the condition of the operation; in this case, the variable drive of the spinning frame. Details of the operation of the pneumatic relay 112 and of the air motor 114 and its connection to the variable drive of the spinning frame are disclosed in the aforementioned U.S. Pat. No. 3,332,224 and, therefore, it is not necessary to repeat the same herein. It will suffice to state that the pneumatic relay 112 is adjustable to obtain a definite position for the positioner of the air motor 114 at the start of an operation so that compensation can be made for wear of the variable drive or the like and absolute repeatability of programs can be obtained. Of course, it will be appreciated that the system of the present invention is not dependent on the pneumatic relay 112 and the air motor 114 as the output control signal from the pressure relay 40 may be used directly to control a particular operator.

The system of the present invention heretofore described and illustrated in the drawings fully and effectively accomplishes the objects and advantages of the present invention. It will be realized, however, that the foregoing specific embodiments have been shown and described for the purpose of illustrating the principles of this invention and are subject to some changes without departing from such principles or from the spirit of the invention. While the invention has been described in connection with a speed control, it will be appreciated that such invention is fully adapted as a programming control for temperature, pressure, volume, or the like.

I claim:

1. An apparatus for programming and controlling a parameter of desired functions into a winding operation by emitting an output pressure control signal to control the magnitude of the winding operation at a particular state of the operation comprising:
   a. transducer means for sensing the state of operation and translating the sensed state of operation into rotary motion, said transducer means including;
      1. a rack movable longitudinally in response to a change in the state of the winding operation but reciprocable within the state of the winding operation;
      2. an output shaft rotatable to different positions upon changes of the state of winding operation;
      3. a pinion mounted on said shaft and engaging said rack, said pinion being freely rotatable on said shaft; and
      4. a lost motion connection means between said pinion and said shaft, whereby said pinion rotates back and forth during reciprocation of said rack within the state of the winding operation without rotating said shaft and whereby said pinion operatively rotates said shaft when there is a change in the state of the winding operation causing longitudinal movement of the rack;
   b. a program card mounted on said shaft for rotation thereby, said program card having a periphery defining a profile of a plurality of arcuate extents on different radii and having different circumferential lengths so as to define the parameter of different conditions of the operation;
   c. a lever member mounted on a pivot, said lever member including;
      1. a follower at one end thereof engaging the profile of said program card and following the same when said program card is rotated;
   d. a source of supply pressure;
   e. a pressure relay including;
      1. an inlet port connected to said source of supply pressure;
      2. an outlet port for emitting a pressure control signal to change the condition of operation; and
      3. pressure responsive and spring biased means between said inlet port and said outlet port for controlling the magnitude of the pressure control signal emitted, said pressure responsive and spring biased means including;
         a. means movable by the other end of said lever member as determined by the profile of said program card for causing the output control signal to be at a predetermined magnitude proportional to the program defined by the program card at the particular state of operation.

2. An apparatus as claimed in claim 1 in which adjacent circumferential arcuate extents are separated by angular extents defining a rate of change between different conditions of operation.

3. An apparatus as claimed in claim 1 in which adjacent circumferential arcuate extents are separated by portions having an angle to a tangent of the circumference of the arcuate extent which is intersected, said angle portions defining a rate of change between different conditions of operation.

4. An apparatus as claimed in claim 1 in which said lever member intermediate its pivot point and said follower is provided with a resilient portion to compensate for movement of the other end of said lever member.

5. An apparatus as claimed in claim 1 in which said pressure relay includes:
   1. a first chamber communicating with said inlet port;
   2. a second chamber communicating with said first chamber and with said outlet port;
   3. valve means between said first chamber and said second chamber;
   4. said pressure responsive and spring biased means including a diaphragm in said chamber, said diaphragm coacting with said valve means, and spring means coacting with said diaphragm and with said means movable by said lever member; and 5. said diaphragm having a passage therethrough opening to atmosphere and said valve means including a valve element for closing said passage from communication with said second chamber.

6. An apparatus as claimed in claim 5 in which said pressure relay further includes:
   1. a third chamber in communication with said second chamber;
   2. a diaphragm in said third chamber;
   3. spring means urging said third chamber diaphragm towards a second chamber diaphragm; and
   4. means operatively connecting said second and third chamber diaphragms to each other.

7. An apparatus as claimed in claim 1, in which said lost motion connection means includes a drive wheel fixedly connected to said shaft adjacent said pinion, said drive wheel having an arcuate cut-out portion on its periphery, and a pin extending axially from said pinion and riding in said arcuate cut-out portion.